Dec. 10, 1935.  G. A. JULIUS  2,023,839
TOTALIZATOR TICKET ISSUING MACHINE
Filed Dec. 7, 1933
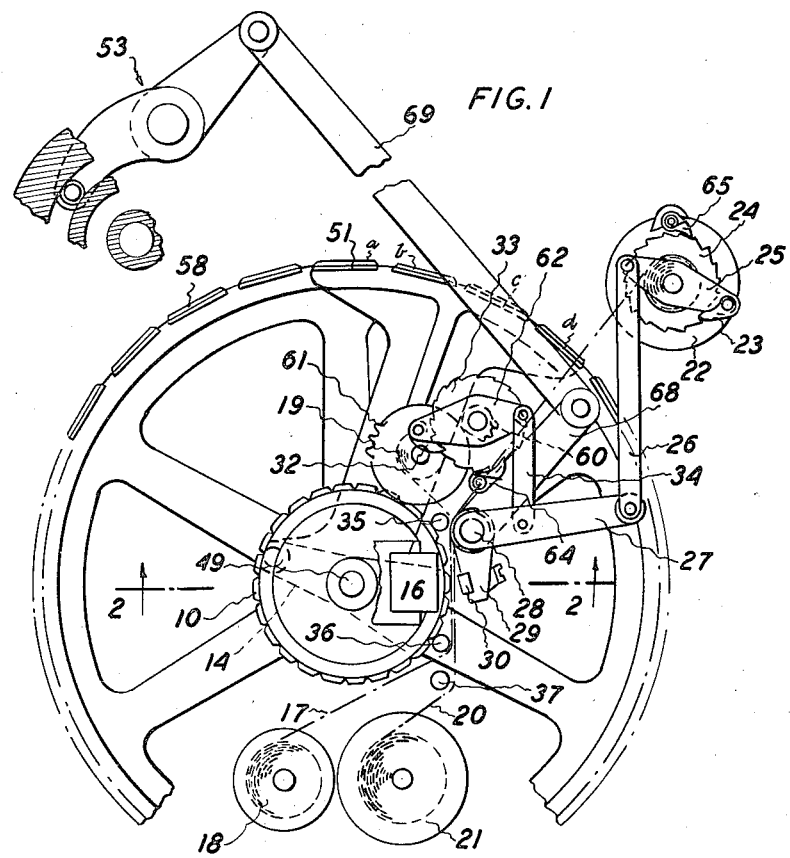
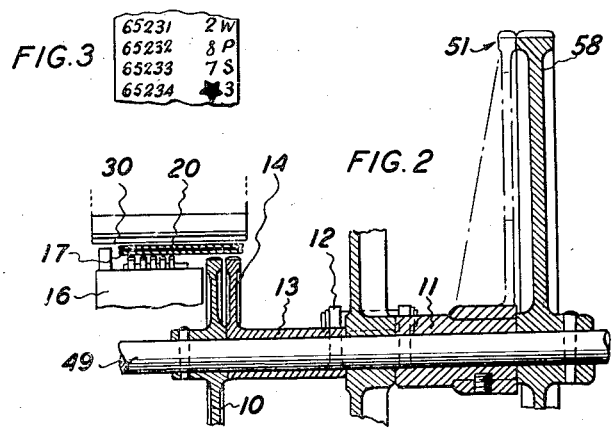
G. A. Julius
INVENTOR
By Marks & Clerk
Attys.

Patented Dec. 10, 1935

2,023,839

UNITED STATES PATENT OFFICE 2,023,839

TOTALIZATOR TICKET ISSUING MACHINE

George Alfred Julius, Sydney, New South Wales, Australia

Application December 7, 1933, Serial No. 701,382
In Australia December 19, 1932

1 Claim. (Cl. 101—68)

It is of great practical importance that totalizator tickets shall carry certifying marks to minimize risk of fraud on the part of persons who may alter them and then seek payment of dividends on them. Many instances have been found in the operation of totalizator apparatus in which tickets in the hands of purchasers have been altered by them in order to fraudulently procure the payment of prize moneys.

Known ticket issuing machines (such for instance, as those described in United States Patent No. 1,744,771 dated January 28, 1930) contain certain means for applying check markings to tickets, indicating the number of the competitor, the class of bet ("Win", or "Place" or "Show", or "Test") the date and the race number. The present invention consists in an auxiliary registration device for such machines and it has been devised to enable a pay officer to list all winning tickets from a paper record strip. Tickets on which claims are made are checked against this list before payment is made on them, and unclaimed dividends may be readily traced from it. By comparison with the paper strip record any ticket which has suffered alteration after issue can be identified with certainty.

In an issuing machine of the type described in United States Patent No. 1,744,771, a number printing wheel applies markings to the ticket strip which indicate the competitor to which the issued ticket is to apply and another printing wheel applies markings which indicate the class in which the ticket has been called for ("Win", or "Place", or "Show", or "Test"). In an issuing machine embodying the present invention, a consecutive numbering device is fitted which applies a serial number to each ticket that is issued through the machine.

The auxiliary device is a paper record strip printer geared to the issuing machine; it is arranged for duplicating on a continuous paper strip the markings which are applied to the main ticket strip by the competitor type wheel and by the ticket class type sector, and by the serial numbering device.

The accompanying drawing illustrates only so much of the structural features of the apparatus which is described in my beforementioned patent as is necessary to define the nature of the present invention.

Fig. 1 is a side elevational view; it shows the competitor number printing wheel (58) and the ticket class printing sector (51) of the known machine; it shows also the paper record strip and the printer assembly by means of which the check marking is applied to the paper record strip;

Fig. 2 is a fragmentary sectional view through the type wheel (58) and sector (51) and certain other parts of the printer assembly by which the record strip is printed; and Fig. 3 is a view of portion of the record strip which is produced in the machine.

58 is the competitor number marking wheel, and 51 the class marking sector of the known machine. The sector 51 has four positions respectively for "Win", "Place", "Show", and "Test" (marked a, b, c, and d), and it is set at the appropriate one of these positions for marking a ticket about to be issued upon operation of the known dialling device, which is set and plunged by the ticket selling clerk when a ticket is called for by an intending purchaser.

As shown in Fig. 2, the spindle 49 which carries the wheel 58 and the sector 51 is extended, and there is fixed on the extension portion of it a competitor number printing wheel 10 which has a type face which corresponds with the type face on the printing wheel 58. The sector 51 is fixed to a sleeve 11 which is rotatable on the spindle 49, and this sleeve 11 is coupled by a bridging yoke 12 to another sleeve 13 on the same spindle. A ticket class sector 14 having a type face corresponding with the type face on the ticket class sector 51 is fixed on or is formed integral with the sleeve 13. This sector 14 is positioned side-by-side with the competitor number wheel 10 and also side-by-side with a metal consecutive numbering stamp 16 of conventional construction. 17 is an ink ribbon, 18 its feed spool which is fitted to run with a little friction so as to keep the ribbon taut, and 19 a driver barrel on which it is wound from the spool 18. 20 is the record strip, 21 a feed spool therefor also fitted to run with a little friction to hold the paper strip taut, and 22 a take-up spool therefor. The paper feed device by which the spool 22 is driven comprises a pawl 23 driving a detent wheel 24 which is fixed to the spindle which carries the spool 22 engaged on it. The pawl 23 is pivoted on an oscillating arm 25 to which reciprocating movements are applied by means of a link 26 which articulates it to an arm 27 which is movable on a spindle 28. Another arm 29 which is attached to the arm 27 carries a platen 30 in operative relation to the faces of the type numbering stamp 16, the type wheel 10, and the type sector 14. The ribbon feed is a pawl 32 coacting with a detent wheel 33 which is geared to the take-up spool 19 by the gear train 60—61. The pawl 32 is carried on an oscillating arm 62 which is articulated by a link 34 to the arm 27. 35 and 36 are guide bars over which the ink ribbon is drawn and stretched intermediate the spools 18 and 19. The record strip 20 runs over a guide bar 37 and thence over the spindle 28 which forms a guide for it, to the spool 22. 64 and 65 are check pawls for preventing reverse movement of the spools. The ribbon 17 runs between the record strip 20 and the type wheel 10, the type sector 14 and the numbering stamp 16; this stamp is advanced one digit for each operative movement of the platen 30, the stamp movement being effected by a link or tappet actuated from any appropriate moving part in the assembly. When the platen 30 is rocked towards the wheel 10 and sector 14 the record strip is printed through the ink ribbon with the characters on the type faces which are for the time being in register position.

Each ticket that is issued from the machine is numbered in correspondence with the consecutive number printed on the paper record strip, Fig. 3, side-by-side with the competitor number and class number which are marked on the strip by the type faces on the wheel 10 and the sector 14, so that each ticket issued can be afterwards identified with the corresponding entry on the record strip 20. The strip 20 shows (as illustrated in Fig. 3) the following record: Ticket No. 65,231 was a "Win" ticket issued on competitor No. 2; ticket No. 65,232 was a "Place" ticket issued on competitor No. 8; ticket No. 65,233 was a "Show" ticket issued on competitor No. 7; and ticket No. 65,234 was a "Test" (cancelled) ticket from No. 3 issuing machine. The record strip is printed line by line automatically as the tickets are printed by the wheels 50 and 51. The printed tickets are severed by a guillotine and issued one by one out of the machine. The record strip is wound upon the spool 22 and from the record printed thereon a list can be compiled showing the check particulars required for verifying the authenticity of every ticket issued out of the machine to a purchaser, and unless every one of the markings on a fraudulently altered ticket corresponded with the markings on the strip record the fraudulently altered ticket would be instantly detected by the paying clerk.

The record strip spools are mounted for rapid removal and replacement, so that at the end of a race, the spool carrying the printed length of the record strip can be readily removed and replaced by an empty spool in readiness for the next race.

Operative movement is applied to the arms 27 and 29 through an arm 68 which connects them through a link 69 to the oscillator mechanism 53 of the issuing machine.

What I claim as my invention and desire to secure by Letters Patent is:—

In a totalizator printing and issuing machine, a single shaft, a type faced main ticket printing wheel element and a ticket printing sector element mounted on said shaft, one of said elements being fixed to said shaft and the other rotatable relatively thereto, an auxiliary printing device for producing a consecutive identification record of all tickets printed by said elements, said device including an auxiliary wheel element and an auxiliary sector element both mounted on said shaft and having type faces corresponding respectively with the type face ticket printing wheel and sector elements, one of the auxiliary elements being rigidly connected with the shaft, and means coupling the other auxiliary element with the rotatable main element, record strip feeding means, ink ribbon feeding means, a platen coacting with said auxiliary elements, and an actuating member common to the record strip and ink ribbon feeding means and said platen.

GEORGE ALFRED JULIUS.